(12) United States Patent
Wilhelmsson et al.

(10) Patent No.: US 10,097,965 B2
(45) Date of Patent: Oct. 9, 2018

(54) METHOD AND NETWORK NODE FOR BROADCASTING

(71) Applicant: Telefonaktiebolaget LM Ericsson (publ), Stockholm (SE)

(72) Inventors: Leif Wilhelmsson, Dalby (SE); Robert Baldemair, Solna (SE); Bengt Lindoff, Bjarred (SE); Yngve Selen, Uppsala (SE); Anders Wallen, Ystad (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 73 days.

(21) Appl. No.: 15/103,294

(22) PCT Filed: Dec. 12, 2013

(86) PCT No.: PCT/EP2013/076409
§ 371 (c)(1),
(2) Date: Jun. 9, 2016

(87) PCT Pub. No.: WO2015/086080
PCT Pub. Date: Jun. 18, 2015

(65) Prior Publication Data
US 2016/0309305 A1    Oct. 20, 2016

(51) Int. Cl.
*H04W 4/06* (2009.01)
*H04B 7/0408* (2017.01)
(Continued)

(52) U.S. Cl.
CPC ............ *H04W 4/06* (2013.01); *H04B 7/0408* (2013.01); *H04B 7/0617* (2013.01);
(Continued)

(58) Field of Classification Search
CPC ....... H04W 4/06; H04W 4/021; H04W 4/025; H04B 7/0408; H04B 7/0617; H04B 7/0695
See application file for complete search history.

(56) References Cited

U.S. PATENT DOCUMENTS 7,805,167 B1 * 9/2010 Esmailzadeh .......... H01Q 1/246
455/562.1
9,801,106 B2 * 10/2017 Baldemair ........ H04W 36/0088
(Continued)

OTHER PUBLICATIONS

PCT International Search Report, dated Aug. 13, 2014, in connection with International Application No. PCT/EP2013/076409, all pages.
(Continued)

*Primary Examiner* — Walli Butt
(74) *Attorney, Agent, or Firm* — Leffler Intellectual Property Law, PLLC (57) ABSTRACT

The disclosure relates to a method performed in a network node for broadcasting. The network node is configured to broadcast signals to communication devices located within a coverage area of the network node. The method comprises: establishing location information for a subset of the communication devices, the subset comprising communication devices targeted by the broadcast signal; establishing at least one antenna pattern based on the established location information for the subset of communication devices; and broadcasting according to the established at least one antenna pattern. The disclosure also relates to corresponding network node, computer program and computer program product.

15 Claims, 2 Drawing Sheets

(51) Int. Cl.
*H04B 7/06* (2006.01)
*H04W 4/021* (2018.01)
*H04W 4/02* (2018.01)

(52) U.S. Cl.
CPC .......... *H04B 7/0695* (2013.01); *H04W 4/021* (2013.01); *H04W 4/025* (2013.01)

(56) References Cited

U.S. PATENT DOCUMENTS

| | | | | |
|---|---|---|---|---|
| 2007/0249402 | A1* | 10/2007 | Dong | H04B 7/0408 455/562.1 |
| 2008/0261658 | A1* | 10/2008 | Jin | H04W 16/28 455/562.1 |
| 2010/0064193 | A1* | 3/2010 | Huschke | H04B 7/0689 714/748 |
| 2010/0272077 | A1* | 10/2010 | van Rensburg | H04B 7/024 370/336 |
| 2011/0069652 | A1* | 3/2011 | Kakani | H04L 12/185 370/312 |
| 2014/0225776 | A1* | 8/2014 | Harel | H01Q 3/00 342/373 |
| 2017/0207841 | A1* | 7/2017 | Kim | H04B 7/0617 |

OTHER PUBLICATIONS

PCT Written Opinion, dated Aug. 13, 2014, in connection with International Application No. PCT/EP2013/076409, all pages.

\* cited by examiner

METHOD AND NETWORK NODE FOR BROADCASTING

TECHNICAL FIELD

The technology disclosed herein relates generally to the field of broadcasting in wireless networks, and in particular to broadcasting by using directional beams.

BACKGROUND

In a wireless communication network, broadcasting saves bandwidth as well as energy utilization and is therefore used as an efficient means to send the same information to many users. An example of such broadcasting is live television (TV). In order to reach many users, the broadcasting, i.e. transmitted signal, is often processed so as to reach a large coverage area. However, broadcasting also creates interference within the wireless communication network.

In contrast, point-to-point communication is intended to reach only a particular user, and in order to improve coverage for the point-to-point communication, beamforming may be used. Radio propagation conditions may require beamforming, and this is in particular the case for bandwidths comprising higher frequencies, e.g. 60 GHz and higher. The beamforming results in a signal that is optimized for the particular user in a given direction, and interference can be reduced towards other users in other directions. Further, the more directive the beam is, the more the link-budget is improved in general. However, as the directivity increases, it will only be possible for those users that are very close to the center of the beam to receive the signal.

Point-to-point communication could be used also for sending the same information to many users, but this would be a very inefficient use of resources.

The reaching of many users with the same information thus entails tradeoffs, e.g. in view of obtaining the most efficient use of the available bandwidth while minimizing interference.

SUMMARY

An object of the present disclosure is to improve the above situation and solve or at least alleviate at least one of the above mentioned problems.

The object is according to a first aspect achieved by a method performed in a network node for broadcasting. The network node is configured to broadcast signals to communication devices located within a coverage area of the network node. The method comprises establishing location information for a subset of the communication devices, the subset comprising communication devices targeted by the broadcast signal; establishing at least one antenna pattern based on the established location information for the subset of communication devices; and broadcasting according to the established at least one antenna pattern.

The object is according to a second aspect achieved by a network node for broadcasting. The network node is configured to broadcast signals to communication devices located within a coverage area of the network node. The network node comprises a processor and memory, the memory containing instructions executable by the processor, whereby the network node is operative to: establish location information for a subset of the communication devices, the subset comprising communication devices targeted by the broadcast signal; establish at least one antenna pattern based on the determined location information for the subset of communication devices; and broadcast according to the established at least one antenna pattern.

The object is according to a third aspect achieved by a computer program for a network node for broadcasting, wherein the network node is configured to broadcast signals to communication devices located within a coverage area of the network node. The computer program comprises computer program code, which, when executed in the network node causes the network node to: establish location information for a subset of the communication devices, the subset comprising communication devices targeted by the broadcast signal; establish at least one antenna pattern based on the determined location information for the subset of communication devices; and broadcast according to the established at least one antenna pattern.

The object is according to a fourth aspect achieved by a computer program product comprising a computer program as above, and a computer readable means on which the computer program is stored.

Further features and advantages of the present disclosure will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Broadcasting and beamforming are typically very hard to combine, as beamforming naturally limits the area where the broadcasting signal can be received. Briefly, the present disclosure identifies, explicitly or implicitly, the locations of potential receivers of a broadcast signal such that the broadcasted message is received by those interested in this message, but not necessarily by others. By using knowledge of the location of the receivers a suitable direction and beamwidth can be chosen such that a desired signal quality is obtained at the different receivers.

Figure 1:
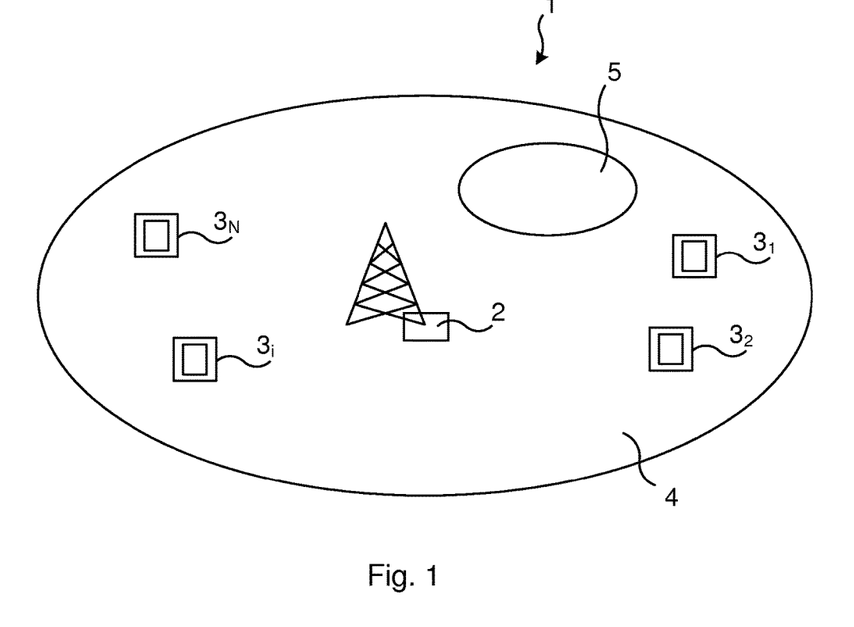
FIG. 1 illustrates schematically an environment in which embodiments of the present disclosure may be implemented.

FIG. 1 illustrates schematically an environment in which embodiments of the present disclosure may be implemented. A wireless communication network 1 comprises a network node 2, e.g. an evolved Node B (eNB) in case of using technology according to Long Term Evolution (LTE) or access points (AP) in case of Wireless Fidelity (Wi-Fi). To date, LTE networks have been primarily deployed in frequency bands from around 700 MHz to around 2.5 GHz. These frequencies are well suited for wide area coverage. As the available spectrum resources in this range are relatively scarce, there is a growing interest in deploying wireless communication systems, e.g. based on LTE, at considerably higher frequencies, e.g. around 60 GHz, in order to meet growing traffic demands. Communication in frequency ranges above 10 GHz is often referred to as millimeter wave (mmW) communication, due to the associated short wavelength. When referring to the wireless communication network 1 herein, it is noted that it may operate at any frequency. However, the various embodiments presented in this disclosure are particularly advantageous when used for mmW communication.

The network node 2 enables wireless communication for a number of communication devices $3_1, 3_2, \ldots, 3_i, \ldots, 3_N$ residing within reach of the network node 2, i.e. being within a coverage area 4 of the network node 2. The communication device $3_1, 3_2, \ldots, 3_i, \ldots, 3_N$ may be any type of device able to communicate wirelessly with the network node 2, for example a smart phone, mobile phone or laptop. Such communication devices can be denoted in different ways, e.g. user equipment, mobile device, user terminal, receiver etc.

In the following, embodiments of the present disclosure are described for a specific scenario. It is however noted that the disclosure is not limited to such scenario, and may be applied e.g. for other types of broadcasting information or in other set-ups, e.g. involving various network nodes. Examples of such network nodes comprise APs in case of Wi-Fi and eNB in case of LTE.

The network node 2 is in this particular scenario used for broadcasting live TV. Assuming that there are in total N users having a respective communication device $3_1, 3_2, \ldots, 3_i, \ldots, 3_N$ and residing within the coverage area 4 of the network node 2. There are in total I users, where I>1 (else point-to-point transmission would probably be used), that are interested in this broadcast transmission. There may thus be more users within the coverage area 4 of the network node 2, but only I users are interested in receiving this broadcast signal. Moreover, it is assumed that the network node 2 has knowledge of where these I users are located, or knowledge of where these I users most likely will be located e.g. at certain times.

In one embodiment, the information about which users are interested in the broadcast transmission is identified by the network node 2 receiving, from the users, a message informing about this. One or more of the users may at the same time inform the network node 2 about their respective location. Such information may be transmitted over an existing wireless link between the network node 2 and the user, with the same radio access technology (RAT) by means of which the network node 2 performs its transmission (e.g. LTE) or by means of a different technology. For example, the communication device $3_i$ of user i may be able to communicate with the network node 2 using wireless communication according to LTE, in the same frequency band as used for the broadcast transmission or in a different frequency band, and also according to a second technology such as e.g. Bluetooth. The communication device $3_i$ may then send its location over Bluetooth while receiving broadcast transmissions using LTE. Alternatively or additionally, the position of the users that are interested in receiving the broadcast information may be obtained by the network node 2 itself. As another example, the position of the communication devices interested in receiving the broadcasting may be obtained using services of e.g. Global Positioning System (GPS).

When the location information is provided by the user, the user might thus have obtained the information by using GPS, or using some positioning algorithm making use of Bluetooth low energy (BLE) or Wireless Fidelity (Wi-Fi). When the positioning information is extracted by the network node 2 itself it may for example be based on Received Signal Strength Indication (RSSI) estimation and/or estimation of the direction of the user or e.g. by some other network based positioning technology such as Observed Time Difference of Arrival (OTDOA). These estimations may be performed over the same radio access technology as being used for the broadcasting, or over a different technology. Still other examples of positioning methods that could be used comprise radio frequency fingerprinting, and observed time of arrival. In LTE Rel-9 dedicated positioning reference signals for positioning are introduced, and these could be used for the positioning purposes of the present disclosure.

In another embodiment, no explicit information about which users are interested in the broadcast transmission is used. Instead, it is assumed that all users within a certain area are potentially interested in receiving the transmission. In this embodiment, knowledge of the positions of the users within this particular area may be obtained from the users or by estimations at the network node 2, or by a combination of both. In such embodiments it is assumed that the users are known to the network node 2. This might be the case e.g. because of earlier transmissions, that they have registered with the network node 2, or that another transmission between the network node 2 and the communication device $3_i$ is ongoing in parallel.

In the above embodiments, whether or not explicit information is obtained concerning the users interest in receiving the broadcast transmission, the direction of the beam as well as the width of the beam may be based on the known locations. The more closely the users are located, the narrower the beam can be made. This reduces interference towards other users, and adapting power of the beam may further reduce interference as well as increase signal quality received by the communication devices interested in the broadcast transmission. As a particular example, the shape of the beam may be chosen such that the performance for the user which is expected to have the least favorable location is maximized. The other users will then have at least this good performance. Based on the expected performance for the "worst user", the network node 2 may e.g. choose coding and modulation formation for the broadcast transmission.

In this context it may be noted that the goal is that the beams should reach all the I users that are interested in receiving the broadcast transmission. It might however be the case that, e.g. due to certain quality requirements of the broadcast signal, it is suitable or necessary to make the beam narrower and thus leaving out some of the interested users. In this specification, the T users reached by the beam to be established are referred to as targeted users. Thus, in the following, the T targeted users are reached by the established beam(s), and T is ideally equal to I, but may be less than I.

When the beamforming allows for very high data rate this means that the transmission time may be reduced compared with not utilizing beamforming. High data rate may be translated into higher-order modulation and high coding rate. Assuming for instance that a video stream is broadcasted, and that the average data rate of the video stream is 1 Mbps. Without knowledge of where the potential users are, the transmission may have to be omni-directional and because of this a robust coding and modulation scheme corresponding to 1 Mbps data rate may have to be used. This means that the receivers of the communication devices of this video stream would have to be receiving continuously. However, in accordance with the present disclosure, by having knowledge of where the users are, beamforming may be employed such that the data can instead be transmitted at, say, 10 Mbps. This means that the transmission can be achieved in 10% of the time and that the receivers of the communication devices can be turned off for 90% of the time. As a numerical example, the receiver may be turned on for 100 ms, receive 1 Mbit of data which then is buffered and played out at 1 Mbps during one second. An advantage of this is a considerable decrease in the power consumption of the communication device. Another advantage is that the network node 2 may in this way use the remaining 90% of the time to transmit something else; either perform another broadcast transmission or a transmission dedicated to one or several a specific users.

In still other embodiments, no explicit information about users' interest in receiving broadcast transmission or explicit information about location of the users are used. Instead, the network node 2 obtains information about that it is likely that a number of users interested in the broadcast transmission are located in a certain area or a certain direction. As an example of this embodiment, the network node 2 is configurable to steer the beam to cover one of two areas. The network node 2 may for example steer a beam to either cover the entrance of a building or to cover a specific conference area of the same building. At certain times, the network node 2 can choose to broadcast in the direction of the entrance. This could for instance be triggered by the time of day or it could be triggered by information from other network nodes that there are many potentially interested users in that area. Similarly, the beam can be directed towards the conference area when the network node 2 gets an indication, or triggering information, that the people have moved to that area. Again, such triggering information may be based on the time of the day, or it may be based on information from other network nodes.

A narrower beam allows for improved performance for the users which are within the beam. In general there is a trade-off between being able to broadcast to many users and to be able to broadcast a signal supporting very high data rate. In other embodiments, applicable in combination with any of the earlier described embodiments, the beamwidth and the data rate that needs to be supported are selected jointly. In particular, the used data rate may be chosen based on the chosen beamwidth, or the beamwidth may be chosen based on the data rate which needs to be supported. For instance, when additional users enter a particular area the network node 2 may identify that a beam needs to be made wider in order to support all the users. Assuming that the original data rate was 10 Mbps, as the beam is made wider the data rates may have to be reduced to e.g. 1 Mbps in order to reach the larger group of users. Then, if some users in this particular area are found to no longer be interested in the broadcast transmission, the beamwidth may be reduced and the data rate be increased again. Alternatively, the network node 2 may determine that it is required to support a 10 Mbps data stream to provide a specific application. In this case the beamwidth may be reduced such that this data rate is achieved even if that means that one or more of the users will no longer be able to receive this broadcast transmission.

For embodiments where two or more beams are being used, each beam may be adapted separately to account for the locations (measured, estimated, or assumed) of the users in each respective beam. In addition to adjusting the beam width, the available transmission power may be partitioned in various ways between the different beams. This feature may be used if, for example, the distance from the network node 2 to users in some directions is larger than in other directions. In such embodiment it may also be possible to independently adapt the bit rate of the two or more beams.

For instance, one narrow beam may support 10 Mb/s while the other wider beam may support only 1 Mb/s. Such adaptation can be made e.g. by modifying the code rate, the modulation, the transmission time, the transmitted power, the number of Multiple-Input Multiple-Output (MIMO) streams, etc. As a particular example, in order to avoid use of several transceivers in the network node, the bit rate of e.g. two beams may be adapted by performing time division multiplexing between the two beams.

In still other embodiments, the users to be targeted by the same broadcast transmission are grouped in two or more groups, wherein a group consists of one or more users. Independent broadcast transmissions may be used for each group. This is advantageous for example if users are spread out and a beamforming equipment available to the network node 2 does not allow to efficiently cover the interesting area. A particular example comprises a simple beamforming equipment that allows only to adjust beam direction and beam width. If two groups of users are located far from each other both groups could either be served with a single wide beam or each group could be independently served with a narrow beam. Since higher data rates can be used to serve each group in the latter case due to higher beamforming gain, the total amount of radio resources may be lower than in the former case. Using the same numbers as in the above example, with the wide beam a data rate of 1 Mbps may be supported whereas with the narrow beam 10 Mbps are supported. If a communication device has to be awake for 1 s in the former case it only needs to be awake 0.1 s in the latter case; and the network node 2 needs to be awake for $2 \times 0.1$ s=0.2 s instead of 1 s.

Figure 2:
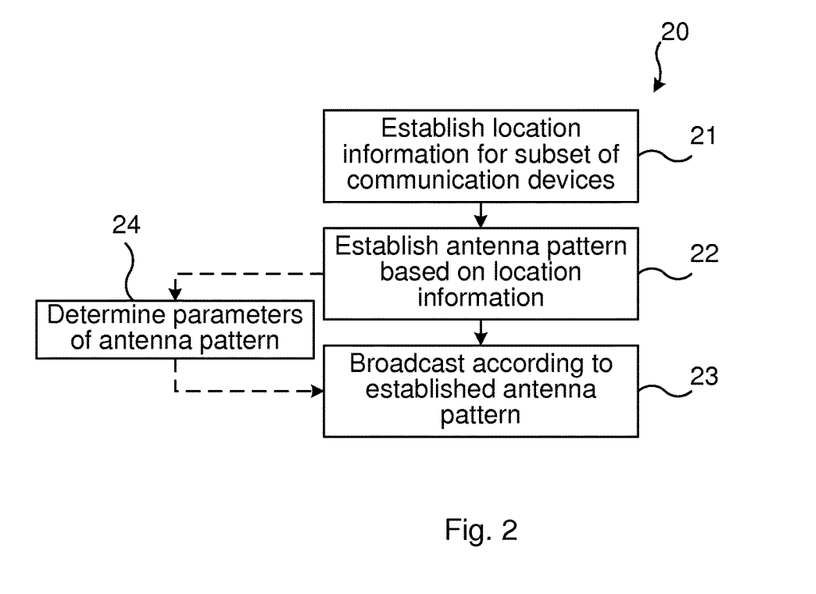
FIG. 2 illustrates a flow chart over steps of a method in a network node in accordance with the present disclosure.

FIG. 2 illustrates a flow chart over steps of a method in a network node in accordance with the present disclosure. The method 20 may be performed in a network node for broadcasting, such as the network node 2 of FIG. 1. The network node 2 is configured to broadcast signals to communication devices $3_i$ located within a coverage area 4 of the network node 2, wherein N is the total number of communication devices within the coverage area 4. The method 20 comprises establishing 21 location information for a subset of the communication devices $3_1, \ldots 3_T$, the subset comprising communication devices $3_1, \ldots 3_T$ targeted by the broadcast signal. That is, of all the N communication devices residing within the coverage area of the network node, the subset comprises T communication devices targeted by the broadcast signal.

As described earlier, the network node 2 may establish the location information in different ways and the location information may e.g. be obtained from different nodes, be measured, estimated, or assumed or any combination of these. For example, the network node 2 may receive location information over an existing wireless link from a particular communication device, e.g. the network node 2 receiving location information from a service such as GPS. As another example, the network node 2 may establish the location information based on e.g. RSSI-estimations for the particular communication device. The network node 2 may receive such location information from another node of the communication system 1, e.g. upon a handover event. As still another example, the network node 2 may retrieve, for a particular broadcast signal, an assumed location of communication devices presumable interested in such broadcast signal. As a particular example, for a live TV transmission broadcasting replays of an ice hockey event, a subset of communication devices targeted by this broadcasting could be located inside or close to the arena where the ice hockey event is taking place.

The method 20 comprises establishing 22 at least one antenna pattern based on the established location information for the subset of communication devices $3_1, \ldots, 3_T$. The established location information for the subset of communication devices $3_1, \ldots, 3_T$ may result in different clusters of communication devices $3_1, \ldots, 3_T$ located in different areas, e.g. two clusters of communication devices located in two different areas. Then one antenna pattern can be established, e.g. defining the use of two beams wherein each beam broadcasts the information towards a respective area. Alternatively, two (or more) antenna patterns can be established and the network node 2 may be configured to switch between them. For the example of two clusters of communication devices and two areas, a respective antenna pattern can then be established for each cluster, each antenna pattern e.g. comprising one beam directed towards one of the areas. In case two antenna patterns are used, more transmit power may be used at each time instant to the targeted communication devices $3_1, \ldots, 3_T$, which may then switch off their receivers when the beam is pointing in another direction. The antenna pattern(s) to be used in broadcasting may thus for example define the number of beams, direction of the beams and particular parameters of the beams. As a specific example, the at least one antenna pattern may comprise two beams, wherein each beam is directed towards the location of a respective established subset of communication devices. The antenna pattern may define that the transmission power in the direction of one of the subsets of communication devices has a value adapted to the user having the least favorable location, e.g. maximized in view of this location. The beam width and direction may correspondingly be adapted based on the locations.

The method 20 comprises broadcasting 23 according to the established at least one antenna pattern.

The method provides improved transmission of broadcast data, particularly when the location of the targeted users changes dynamically. Individual targeted users may obtain improved performance when the number of targeted communication devices is small or when all targeted communication devices are close to each other.

As an example, when the targeted users are spread out over a large area at very different directions, a robust coding and modulation scheme may have to be used to ensure that all targeted users will be able to receive the broadcast data. If it instead is known that all targeted users are very close to one another (or clustered at some few locations), a highly directional signal (or several directional beams) may be used. In this way, the Signal-to-Noise Ratio (SNR) experienced by the targeted users will become higher, and thus a higher data rate may be supported. In this way the data may be sent using less time and thus save power. Alternatively, if for instance video is broadcasted, the video may be sent at a higher resolution.

In an embodiment, the method 20 comprises updating, by repeating the establishing 21 of information and the establishing 22 of at least one antenna pattern, the at least one antenna pattern based on updated location information for the subset of communication devices $3_1, \ldots, 3_T$ and/or based on communication devices being included in or excluded from the subset comprising communication devices $3_1, \ldots, 3_T$, and broadcasting 23 according to the updated antenna pattern. The location information may for instance be updated in accordance with movements of the targeted communication devices $3_1, \ldots, 3_T$. The updating of the antenna pattern may be performed continuously or with predetermined intervals.

In an embodiment, the method 20 comprises determining (box 24 of FIG. 3) parameters of the at least one antenna pattern according to one or more of: transmission parameters maximizing the minimum quality of the targeted communication devices $3_1, \ldots, 3_T$, transmission parameters maximizing the beamwidth while supporting a configured quality, transmission parameters maximizing data rate for a configured beamwidth, number of beams and width of the beams. For example, a data rate of the broadcast signal could be determined for the antenna pattern such that a higher data rate is used for an antenna pattern comprising beams with higher directivity (i.e. narrower beams), and a lower data rate for beams with wider beams. In an embodiment, the method 20 comprises determining, for an antenna pattern that comprises at least two beams, transmission power for each of the at least two beams based on quality of service of the subset of communication devices $3_1, \ldots, 3_T$ in the direction of the respective beam and/or based on distance between the network node 2 and the subset of communication devices $3_1, \ldots, 3_T$.

In an embodiment, the method 20 comprises increasing a data rate of the broadcast signal with increased directivity of beams of the at least one antenna pattern.

In an embodiment, the method 20 comprises receiving, from one or more communication devices $3_i$, a message indicating interest in receiving the broadcast signal, and updating the subset to include the one or more communication devices $3_i$. The method 20 may comprise receiving, from one or more communication devices $3_i$ a message indicating lost interest in receiving the broadcast signal, and updating the subset to exclude the one or more communication devices $3_i$. The subset of communication devices $3_1, \ldots, 3_T$ targeted by the broadcast may thus be kept updated and contain only users interested in receiving the broadcast transmission.

In an embodiment, the method 20 comprises determining one or more sub-areas 5 of the coverage area 4 within which communication devices determined to have interest in receiving the broadcast signal are located, and updating the subset to include such communication devices. For example, the at least one antenna pattern may be spatially fixed, e.g. one or more beams directed towards the entrance of a building, the location of the entrance thus providing the location information of the subset of communication devices. The beams may then be switched on, i.e. broadcasting be performed, at a specific instant of time, e.g. upon end of an event occurring in the building.

In an embodiment, the broadcasting 23 is performed by using a first wireless technology, and wherein the location information is at least partly determined by using a second wireless technology for at least one of the communication devices $3_i$.

Figure 3:
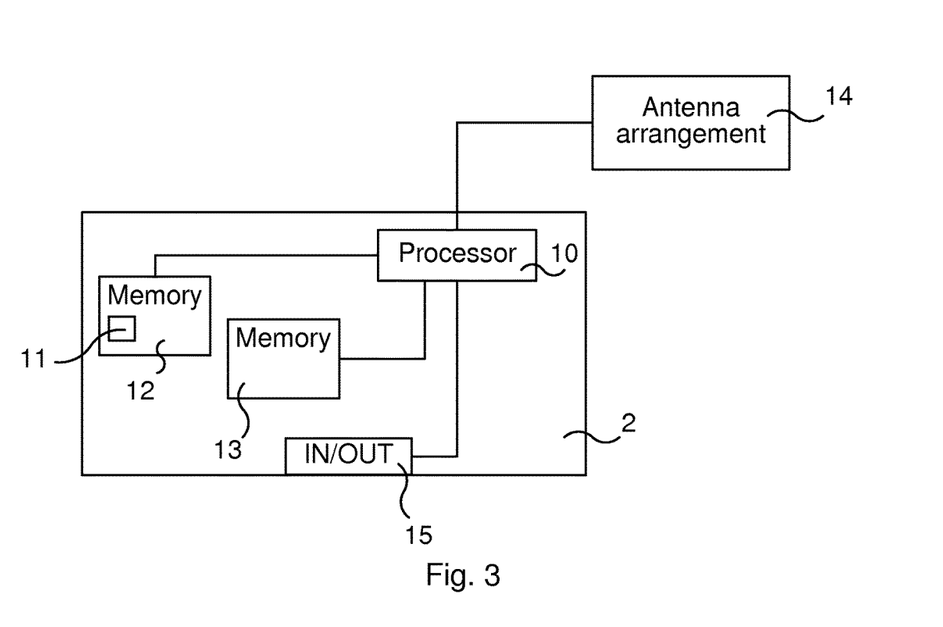
FIG. 3 illustrates schematically a network node and means for implementing methods of the present disclosure.

FIG. 3 illustrates schematically the network node 2 and means for implementing methods of the present disclosure. The network node 2 comprises an antenna arrangement 14 or is connected to such antenna arrangement 14 and is configured to control it. The antenna arrangement 14 comprises antenna elements and other conventional parts (not explicitly illustrated).

The antenna arrangement 15 is configurable for beamforming, whereby the network node 2 is able to beamform transmissions. The direction of the center of a beam as well as the beamwidth may be adjusted. In addition, the antenna arrangement 14 may be configured for more than one beam. In such case the available transmit power may need to be shared between the beams, such that the experienced received SNR at each receiving communication device $3_1$, $3_2, \ldots, 3_i, \ldots, 3_T$ may be lower. The transmit power may, but need not, be shared equally between the beams.

The network node 2 may thus be configured to perform beamforming, which is a signal processing technique. To this end, the network node 2 comprises a processor 10 comprising any combination of one or more of a central processing unit (CPU), multiprocessor, microcontroller, digital signal processor (DSP), application specific integrated circuit etc. capable of executing software instructions stored in a memory 12, which can thus be a computer program product 12. The processor 10 can be configured to execute any of the various embodiments of the method as described in the present description, e.g. the method as described in relation to FIG. 2.

The memory 12 can be any combination of read and write memory (RAM) and read only memory (ROM). The memory 12 may also comprise persistent storage, which, for example, can be any single one or combination of magnetic memory, optical memory, solid state memory or even remotely mounted memory.

A data memory 13 may also be provided for reading and/or storing data during execution of software instructions in the processor 10. The data memory 13 can be any combination of read and write memory (RAM) and read only memory (ROM).

The network node 2 also comprises an interface for communicating with other network nodes, e.g. eNBs or other nodes of a radio access network, or core network entities such as mobile switching center (MSC) or media gateways (MGWs). Such interface is illustrated in FIG. 2 by an input/output device 15.

With reference still to FIG. 3, a network node 2 of a communication system 1 is provided. The network node 2 is configured to perform any combination of the features as described. For example, the network node 2 for broadcasting is configured to broadcast signals to communication devices $3_1, \ldots, 3_N$ located within a coverage area 4 of the network node 2. The network node 2 comprises a processor 10 and memory 12, the memory 12 containing instructions executable by the processor 10, whereby the network node 2 is operative to:

establish location information for a subset of the communication devices $3_1, \ldots, 3_T$, the subset comprising communication devices $3_1, \ldots, 3_T$ targeted by the broadcast signal, establish at least one antenna pattern based on the determined location information for the subset of communication devices $3_1, \ldots, 3_T$, and broadcast according to the established at least one antenna pattern.

In an embodiment, the network node 2 is configured to update, by repeating the establishing of location information and the establishing at least one antenna pattern, the at least one antenna pattern based on updated location information for the subset of communication devices $3_1, \ldots, 3_T$ and/or based on communication devices being included in or excluded from the subset comprising communication devices $3_1, \ldots, 3_T$, and configured to broadcast according to the updated antenna pattern.

In an embodiment, the network node 2 is configured to update the at least one antenna pattern continuously or with predetermined intervals.

In an embodiment, the network node 2 is configured to determine parameters of the at least one antenna pattern according to one or more of: transmission parameters maximizing the minimum quality of the communication devices $3_1, \ldots, 3_T$, transmission parameters maximizing the beamwidth while supporting a configured quality, transmission parameters maximizing data rate for a configured beamwidth, number of beams and width of the beams.

In an embodiment, the network node 2 is configured to determine, for an antenna pattern comprising at least two beams, transmission power for each of the at least two beams based on quality of service of the subset of communication devices $3_1, \ldots, 3_T$ in the direction of the respective beam and/or based on distance between the network node 2 and the subset of communication devices $3_1, \ldots, 3_T$.

In an embodiment, the network node 2 is configured to increase a data rate of the broadcast signal with increased directivity of beams of the antenna pattern.

In an embodiment, the network node 2 is configured to receive, from one or more communication devices $3_i$, a message indicating interest in receiving the broadcast signal, and configured to update the subset to include the one or more communication devices $3_i$. The network node 2 may be configured to receive, from one or more communication devices $3_i$ a message indicating lost interest in receiving the broadcast signal, and configured to update the subset to exclude the one or more communication devices $3_i$.

In an embodiment, the network node 2 is configured to determine one or more sub-areas 5 of the coverage area 4 within which communication devices determined to have interest in receiving the broadcast signal are located, and configured to update the subset to include such communication devices.

In an embodiment, the network node 2 is configured to broadcast by using a first wireless technology, and configured to determine the location information at least partly by using a second wireless technology for at least one of the communication devices $3_i$.

The disclosure of the present application also encompasses a computer program product 12 comprising a computer program 11 for implementing the methods as described, and a computer readable means on which the computer program 11 is stored. The computer program product 12 may be any combination of read and write memory (RAM) or read only memory (ROM). The computer program product 12 may also comprise persistent storage, which for example can be any single one or combination of magnetic memory, optical memory or solid state memory.

The present disclosure thus comprises a computer program 11 for a network node 2 for broadcasting, wherein the network node 2 is configured to broadcast signals to communication devices $3_i$ located within a coverage area 4 of the network node 2. The computer program 11 comprises computer program code, which, when executed in the network node 2 causes the network node 2 to:

establish location information for a subset of the communication devices $3_1, \ldots, 3_T$, the subset comprising communication devices $3_1, \ldots, 3_T$ targeted by the broadcast signal, establish at least one antenna pattern based on the determined location information for the subset of communication devices $3_1, \ldots, 3_T$, and broadcast according to the established at least one antenna pattern.

A computer program product 12 is thus also provided comprising the above computer program 11 and a computer readable means on which the computer program 11 is stored.

The computer program product, or the memory, thus comprises instructions executable by the processor. Such instructions may be comprised in a computer program, or in one or more software modules or function modules.

Figure 4:
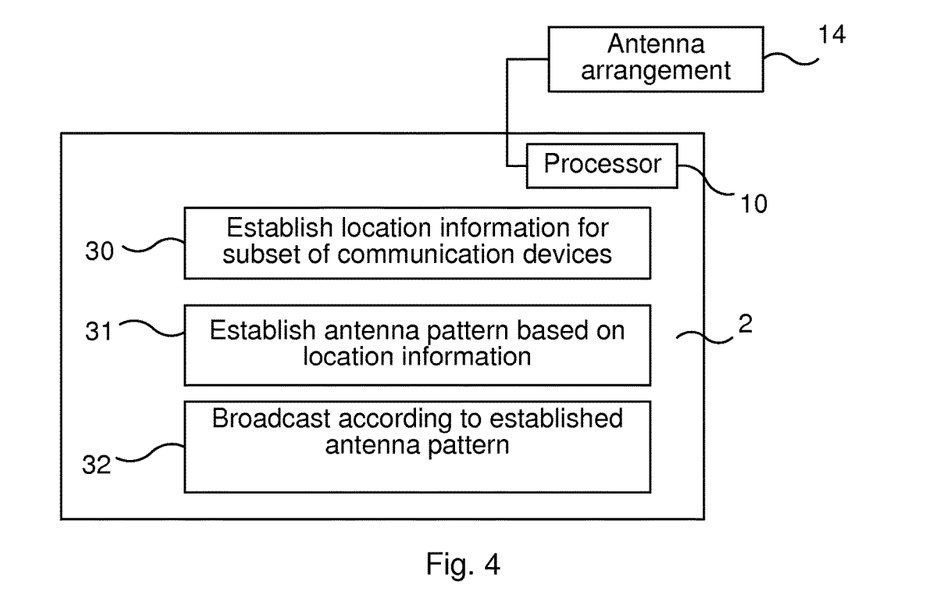
FIG. 4 illustrates a network node comprising function modules/software modules for implementing methods of the present disclosure.

An example of an implementation using function modules/software modules is illustrated in FIG. 4, in particular illustrating network node 2 comprising function modules 30, 31, 32 for implementing methods of the present disclosure. The network node 2 comprises means, in particular a first function module 30, for establishing location information for a subset of the communication devices $3_1, \ldots, 3_T$, the subset comprising communication devices $3_1, \ldots, 3_T$ targeted by the broadcast signal. The network node 2 comprises means, in particular a second function module 31, for establishing at least one antenna pattern based on the established location information for the subset of communication devices $3_1, \ldots, 3_T$. The network node 2 comprises means, in particular a third function module 32, for broadcasting according to the established at least one antenna pattern.

The function modules 30, 31, 32 can be implemented using software instructions such as computer program executing in a processor and/or using hardware, such as application specific integrated circuits, field programmable gate arrays, discrete logical components etc. It is also noted that while some function modules may be implemented using software instructions, others may be implemented using hardware and still others may be implemented using both software instructions as well as hardware.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a network node for broadcasting, the network node being configured to broadcast signals to communication devices located within a coverage area of the network node, the method comprising:
    establishing location information for a subset of the communication devices, the subset comprising communication devices targeted by the broadcast signal;
    establishing at least one antenna pattern based on the established location information for the subset of communication devices;
    broadcasting according to the established at least one antenna pattern; and
    updating, by repeating the establishing of information and the establishing of at least one antenna pattern, the at least one antenna pattern based on updated location information for the subset of communication devices and/or based on communication devices being included in or excluded from the subset comprising communication devices;
    broadcasting according to the updated at least one antenna pattern; and
    determining, for an antenna pattern comprising at least two beams, a transmission power level to be used for each of the at least two beams based on quality of service of the subset of communication devices in the direction of the respective beam and/or based on distance between the network node and the subset of communication devices.

2. The method as claimed in claim 1, wherein the updating the at least one antenna pattern is performed continuously or with predetermined intervals.

3. The method as claimed in claim 1, comprising determining parameters of the at least one antenna pattern according to one or more of: transmission parameters maximizing the minimum quality of the subset of communication devices, transmission parameters maximizing the beamwidth while supporting a configured quality, transmission parameters maximizing data rate for a configured beamwidth, number of beams and width of the beams.

4. The method as claimed in claim 1, comprising increasing a data rate of the broadcast signal with increased directivity of beams of the at least one antenna pattern.

5. The method as claimed in claim 1, comprising receiving, from one or more communication devices, a message indicating interest in receiving the broadcast signal, and updating the subset to include the one or more communication devices or receiving, from one or more communication devices a message indicating lost interest in receiving the broadcast signal, and updating the subset to exclude the one or more communication devices.

6. The method as claimed in claim 1, comprising determining one or more sub-areas of the coverage area within which communication devices determined to have interest in receiving the broadcast signal are located, and updating the subset to include such communication devices.

7. The method as claimed in claim 1, wherein the broadcasting is performed by using a first wireless technology, and wherein the location information is at least partly determined by using a second wireless technology for at least one of the communication devices.

8. A network node for broadcasting, the network node being configured to broadcast signals to communication devices located within a coverage area of the network node, the network node comprising a processor and memory, the memory containing instructions executable by the processor, whereby the network node is operative to:
    establish location information for a subset of the communication devices, the subset comprising communication devices targeted by the broadcast signal;
    establish at least one antenna pattern based on the determined location information for the subset of communication devices;
    broadcast according to the established at least one antenna pattern;
    update, by repeating the establishing of information and the establishing of at least one antenna pattern, the at least one antenna pattern based on updated location information for the subset of communication devices and/or based on communication devices being included in or excluded from the subset comprising communication devices;
    broadcast according to the updated at least one antenna pattern; and
    determine, for an antenna pattern comprising at least two beams, a transmission power level to be used for each of the at least two beams based on quality of service of the subset of communication devices in the direction of the respective beam and/or based on distance between the network node and the subset of communication devices.

9. The network node as claimed in claim 8, configured to update the at least one antenna pattern continuously or with predetermined intervals.

10. The network node as claimed in claim 8, configured to determine parameters of the at least one antenna pattern according to one or more of: transmission parameters maximizing the minimum quality of the subset of communication devices, transmission parameters maximizing the beamwidth while supporting a configured quality, transmission parameters maximizing data rate for a configured beamwidth, number of beams and width of the beams.

11. The network node as claimed in claim 8, configured to increase a data rate of the broadcast signal with increased directivity of beams of the at least one antenna pattern.

12. The network node as claimed in claim 8, configured to receive, from one or more communication devices, a message indicating interest in receiving the broadcast signal, and configured to update the subset to include the one or more communication devices or configured to receive, from one or more communication devices a message indicating lost interest in receiving the broadcast signal, and configured to update the subset to exclude the one or more communication devices.

13. The network node as claimed in claim 8, configured to determine one or more sub-areas of the coverage area within which communication devices determined to have interest in receiving the broadcast signal are located, and configured to update the subset to include such communication devices.

14. The network node as claimed in claim 8, configured to broadcast by using a first wireless technology, and configured to determine the location information at least partly by using a second wireless technology for at least one of the communication devices.

15. A non-transitory computer readable storage medium comprising a computer program for a network node for broadcasting, the network node being configured to broadcast signals to communication devices located within a coverage area of the network node, the computer program comprising computer program code, which, when executed in the network node causes the network node to:
   establish location information for a subset of the communication devices, the subset comprising communication devices targeted by the broadcast signal;
   establish at least one antenna pattern based on the determined location information for the subset of communication devices;
   broadcast according to the established at least one antenna pattern;
   update, by repeating the establishing of information and the establishing of at least one antenna pattern, the at least one antenna pattern based on updated location information for the subset of communication devices and/or based on communication devices being included in or excluded from the subset comprising communication devices;
   broadcast according to the updated at least one antenna pattern; and
   determining, for an antenna pattern comprising at least two beams, a transmission power level to be used for each of the at least two beams based on quality of service of the subset of communication devices in the direction of the respective beam and/or based on distance between the network node and the subset of communication devices.

* * * * *